US006275747B1

(12) United States Patent
Wada et al.

(10) Patent No.: US 6,275,747 B1
(45) Date of Patent: Aug. 14, 2001

(54) MICROCOMPUTER AND ITS ACCESS SPEED CONTROL METHOD

(75) Inventors: Takao Wada, Hitachinaka; Yuzo Ishibashi, Naka-gun; Kiyoshi Kawamura, Tokyo; Yoshikatsu Kuroda, Komaki, all of (JP)

(73) Assignees: Mitsubishi Heavy Industries, Ltd., Tokyo; Japan Nuclear Cycle Development Institute, Obaraki, both of (JP)

( * ) Notice: Subject to any disclaimer, the term of this patent is extended or adjusted under 35 U.S.C. 154(b) by 0 days.

(21) Appl. No.: 09/191,377

(22) Filed: Nov. 13, 1998

(30) Foreign Application Priority Data

Nov. 14, 1997 (JP) .................................................. 9-313253

(51) Int. Cl.[7] .................................................. G05B 21/00
(52) U.S. Cl. .......................... 700/266; 700/283; 700/291; 700/301; 700/302; 250/363.07; 250/370.07; 250/339.11; 250/341.8; 250/344; 702/134
(58) Field of Search ................................... 700/266, 283, 700/291, 301, 302, 304; 250/363.07, 370.07, 339.11, 339.06, 341.4, 344; 702/134

(56) References Cited

U.S. PATENT DOCUMENTS

| 4,433,380 | * | 2/1984 | Abele et al. ........................... 382/131 |
| 4,572,954 | * | 2/1986 | Josephson et al. .............. 250/370.07 |
| 4,590,658 | * | 5/1986 | Funyu et al. ............................. 29/464 |
| 4,591,984 | * | 5/1986 | Mori ................................. 250/363.07 |
| 4,670,892 | * | 6/1987 | Abele et al. ............................... 378/4 |
| 4,733,383 | * | 3/1988 | Waterbury ............................... 368/10 |
| 5,022,027 |   | 6/1991 | Rosario .................................. 714/15 |
| 5,749,048 | * | 5/1998 | Masuda ............................. 455/186.1 |
| 5,754,838 | * | 5/1998 | Shibata et al. ......................... 713/600 |
| 5,761,270 | * | 6/1998 | Unfors ................................. 378/207 |

FOREIGN PATENT DOCUMENTS

| 62-228962A | 10/1987 | (JP) . |
| 4332009A | 11/1992 | (JP) . |
| 5282168A | 10/1993 | (JP) . |
| 10-311878 A | 11/1998 | (JP) . |
| 10-644878 A | 11/1998 | (JP) . |

OTHER PUBLICATIONS

Wasserman et al., Multimodality Medical Imaging for Radiotherapy Treatment Planning, 1994, IEEE, pp. 235–244.*

Yazgan et al., Image Reconstruction With Diffraction Tomography Using Different Invers Radon Trnsform Algorithms, IEEE., pp. 170–173, 1992.*

Vanzura, Automated System For Electromagnetic Field Generation And Immunity Testing, IEEE., pp. 3–10, 1988.*

Dvorak, Fields At A Radiation Measuring Site, IEEE., pp. 87–93, 1988.*

Dvorak, Accuracy Of 30 to 1000 MHz Site Acceptance Tests, IEEE., pp. 317–318, 1988.*

Cheng, Pulsed Monoenergy X–Ray Source, IEEE., pp. 843–844, 1997.

Tyree, Low–Cost Teleoperator–Controlled Vehicle For Damage Assessment And Radiatin Dose Measurement, IEEE., pp. 1361–1365, 1992.

* cited by examiner

Primary Examiner—William A. Cuchlinski, Jr.
Assistant Examiner—McDieunel Marc

(57) ABSTRACT

A microcomputer usable for a long period of time even when disposed in a high dose radiation-exposed environment, and its access speed control method are provided. According to the microcomputer and the method, the total dose of radiation that the microcomputer receives is determined on the basis of detection signals from a radiation detecting element. Based on the determined total dose of radiation, and table data preset by tests and stored into a memory unit, a CPU controls an access speed. Moreover, the CPU, and the memory unit and a circuit interface unit that access the CPU are integrated on a single chip (ASIC) These units on the same chip are deteriorated and changed in the same direction, without fail, on exposure to radiation.

10 Claims, 5 Drawing Sheets

Entire Constitution of Radiation-Hardened Microcomputer

FIG. 1 Functional Blocks of Radiation-Hardened Microcomputer

Relation Drawing of Total Dose of Radiation vs. Waiting Time between CPU and respective circuits

MICROCOMPUTER AND ITS ACCESS SPEED CONTROL METHOD

BACKGROUND OF THE INVENTION

1. Field of the Invention

The present invention relates to a microcomputer and its access speed control method, which is useful when applied to a microcomputer used in electronic equipment of various instruments disposed in a high dose radiation-exposed environment.

2. Description of the Related Art

In a high dose radiation-exposed environment, electronic parts of electronic equipment deteriorate under the influence of radiation. Since function and performance of the electronic parts decline, their long-term use has been impossible.

A conventional microcomputer, in particular, has its semiconductor parts (IC, LSI) rapidly deteriorated by radiation, resulting in marked changes in the characteristics of the semiconductor parts. Consequently, decline in the function and performance of the microcomputer, and its operating defects may occur. Thus, the conventional microcomputer cannot be used for a long period (2 years or more) in a high dose radiation-exposed environment, and had to be used in a radiation-free environment. FIG. 5 is an explanation drawing showing an example of use of a conventional microcomputer.

As shown in this drawing, only a working instrument 32 is installed in a high dose radiation-exposed environment (area A in the drawing) surrounded by a shielding member 33. A microcomputer 31 for controlling this working instrument 32 is installed in a radiation-free environment outside the shielding member 33 (area B in the drawing). To transmit electrical signals between the working instrument 32 in the radiation-exposed environment and the microcomputer 31 in the radiation-free environment, many (e.g., 200 to 300) electrical signal cables 34, over a long distance (e.g., about 100 m), are wired from the working instrument 32 to the microcomputer 31.

As described above, the conventional microcomputer 31 cannot be used in a radiation-exposed environment. Therefore, the working instrument 32, in a radiation-exposed environment, and the microcomputer 31, in an environment not exposed to radiation, must be electrically connected together by the electrical signal cables 34. This has posed the following problems:

① An increase in the number of the electrical signal cables 34 in the radiation-exposed environment has necessitated a large radiation-exposed environment area (such as cells of nuclear power related facilities), induced cost buildup, and made maintainability poor.

② Since the electrical signal cables 34 in the radiation-exposed environment becomes longer, weak signals such as sensor signals cannot be transmitted, or transmission accuracy decreases.

③ The microcomputer 31 cannot be carried on a mobile member in the radiation-exposed environment. Hence, neither a complicated task nor a high precision task can be accomplished by using the mobile member, thus making it difficult to mechanize operations in the radiation-exposed environment.

SUMMARY OF THE INVENTION

The present invention has been accomplished in light of the foregoing earlier technologies. Its an object of the present invention is to provide a microcomputer usable for a long period of time even in a high dose radiation-exposed environment, and its access speed control method.

According to a first aspect of the present invention, a microcomputer having a radiation measuring unit, a storage unit, and a main arithmetic unit is provided. The microcomputer comprises:

a radiation measuring unit which measures a dose of radiation which the microcomputer receives;

a storage unit which stores preset data indicative of a relationship between the dose of radiation and an access speed; and a main arithmetic unit which controls the access speed on the basis of the measured dose of radiation and the preset data.

According to a second aspect of the invention, an access speed control method of a microcomputer having a radiation measuring unit, a storage unit, and a main arithmetic unit is provided. The method comprises:

measuring a dose of radiation which the microcomputer receives;

pre-establishing data indicative of a relationship between the dose of radiation and an access speed; and controlling the access speed on the basis of the measured dose of radiation and the pre-established data.

The microcomputer may further comprise a peripheral control unit, wherein the main arithmetic unit, the peripheral control unit, and the storage unit are integrated on a single chip.

The access speed control method may further comprise integrating the main arithmetic unit, a peripheral control unit, and the storage unit on a single chip.

In the microcomputer, the storage unit may store the preset data in a form of a table.

In the microcomputer, the preset data may be determined by testing.

In the microcomputer, the preset data may be set such that the access speed is reduced as the dose of radiation increases.

In the access speed control method, the pre-establishing step may include the step of obtaining the data by testing.

In the access speed control method, the data may be pre-established such that the access speed is reduced as the dose of radiation increases.

According to a third aspect of the invention, a robot used in a radiation-exposed environment is provided. The robot comprises:

a microcomputer disposed in the radiation-exposed environment, the microcomputer having,
  a radiation measuring unit which measures a dose of radiation which the microcomputer receives,
  a storage unit which stores preset data indicative of a relationship between the dose of radiation and an access speed, and
  a main arithmetic unit which controls the access speed based on the measured dose of radiation and the preset data; and a working instrument disposed in the radiation-exposed environment and controlled by the microcomputer.

PREFERRED EMBODIMENTS OF THE INVENTION

A preferred embodiment of the present invention will now be described in detail based on the accompanying drawings, but it should be understood that the invention is not restricted thereby.

Figure 1:
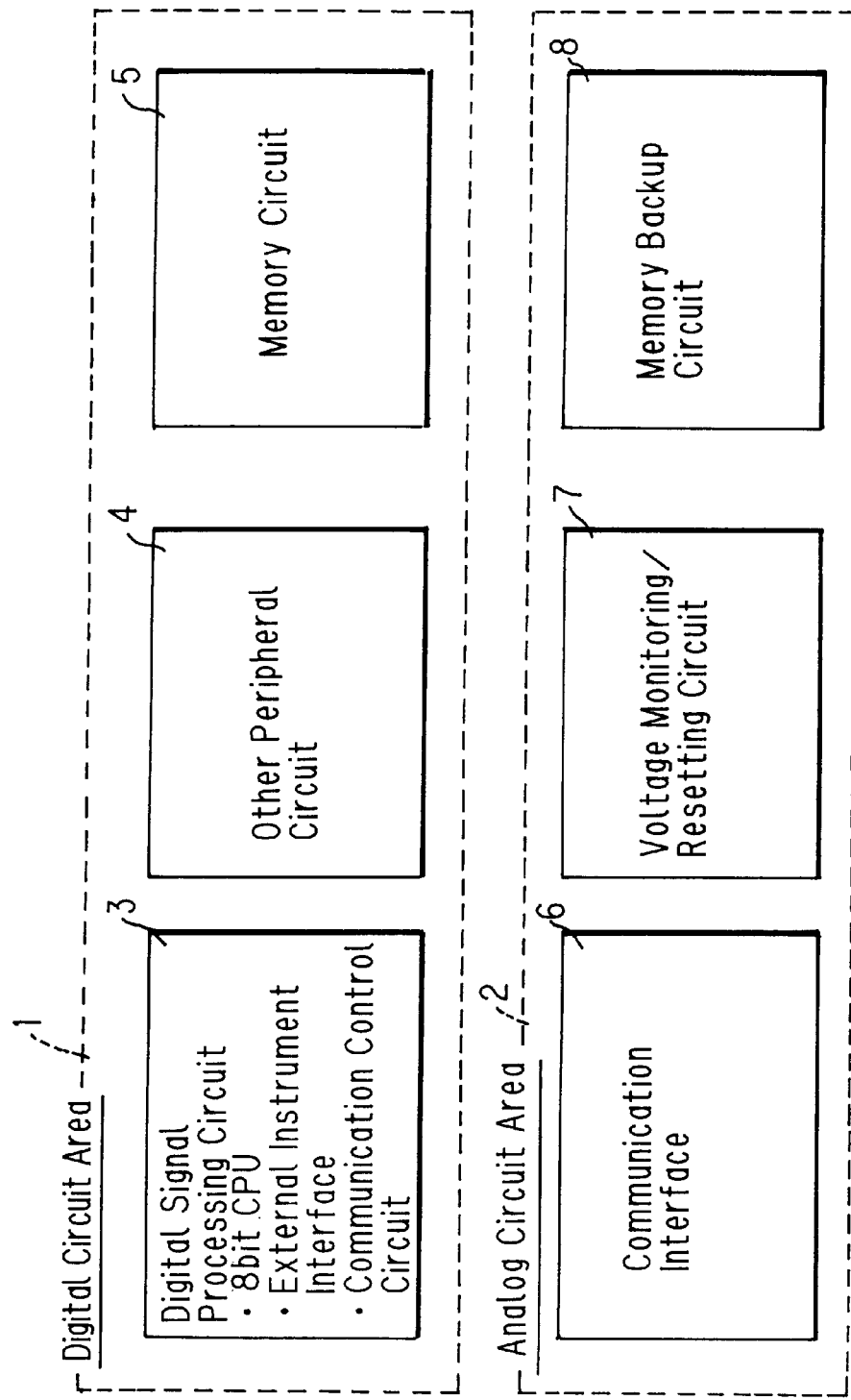
FIG. 1 is a functional block diagram of a mainframe part of a radiation-hardened microcomputer according to a preferred embodiment of the present invention.
Figure 2:
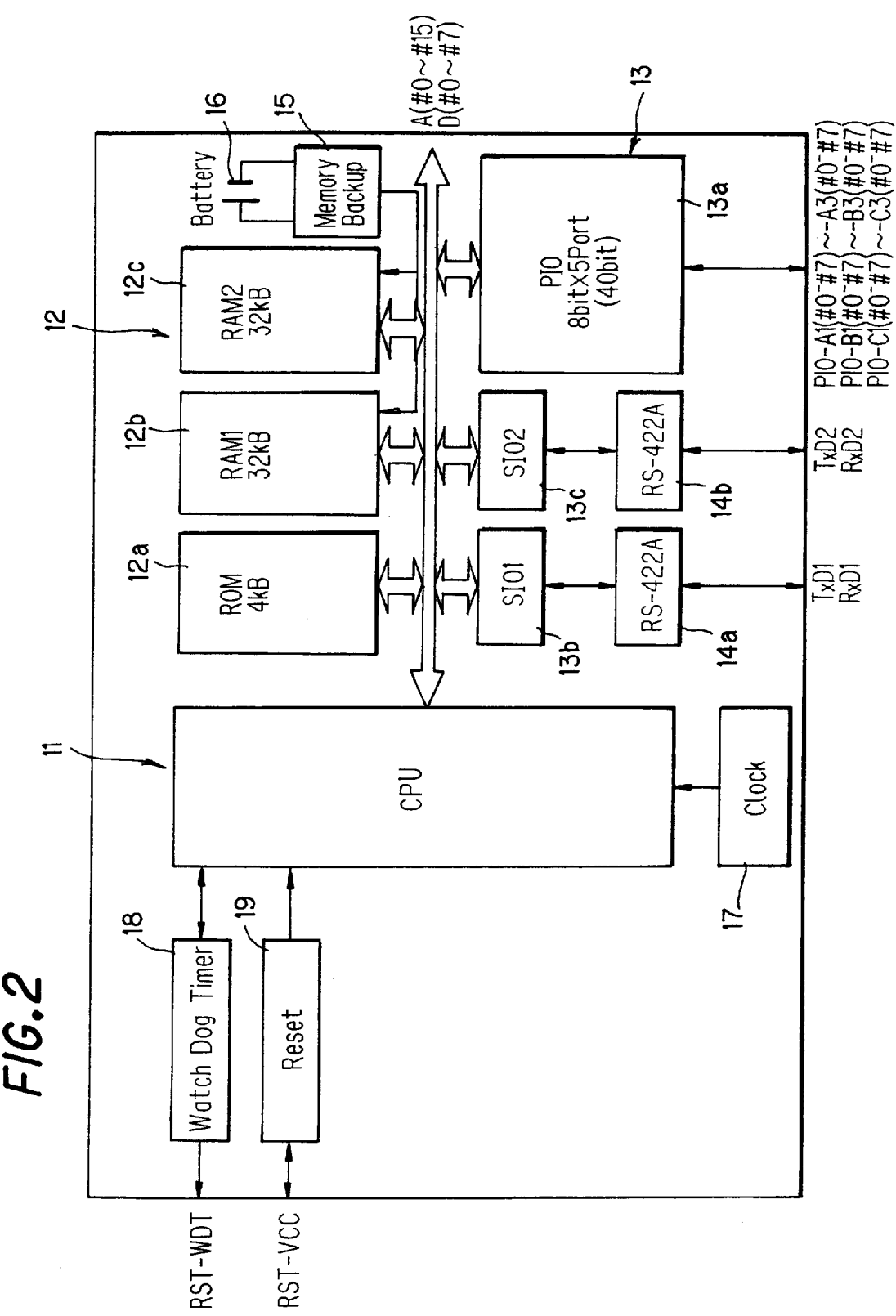
FIG. 2 is a constitution diagram of the mainframe part of the microcomputer.
Figure 3:
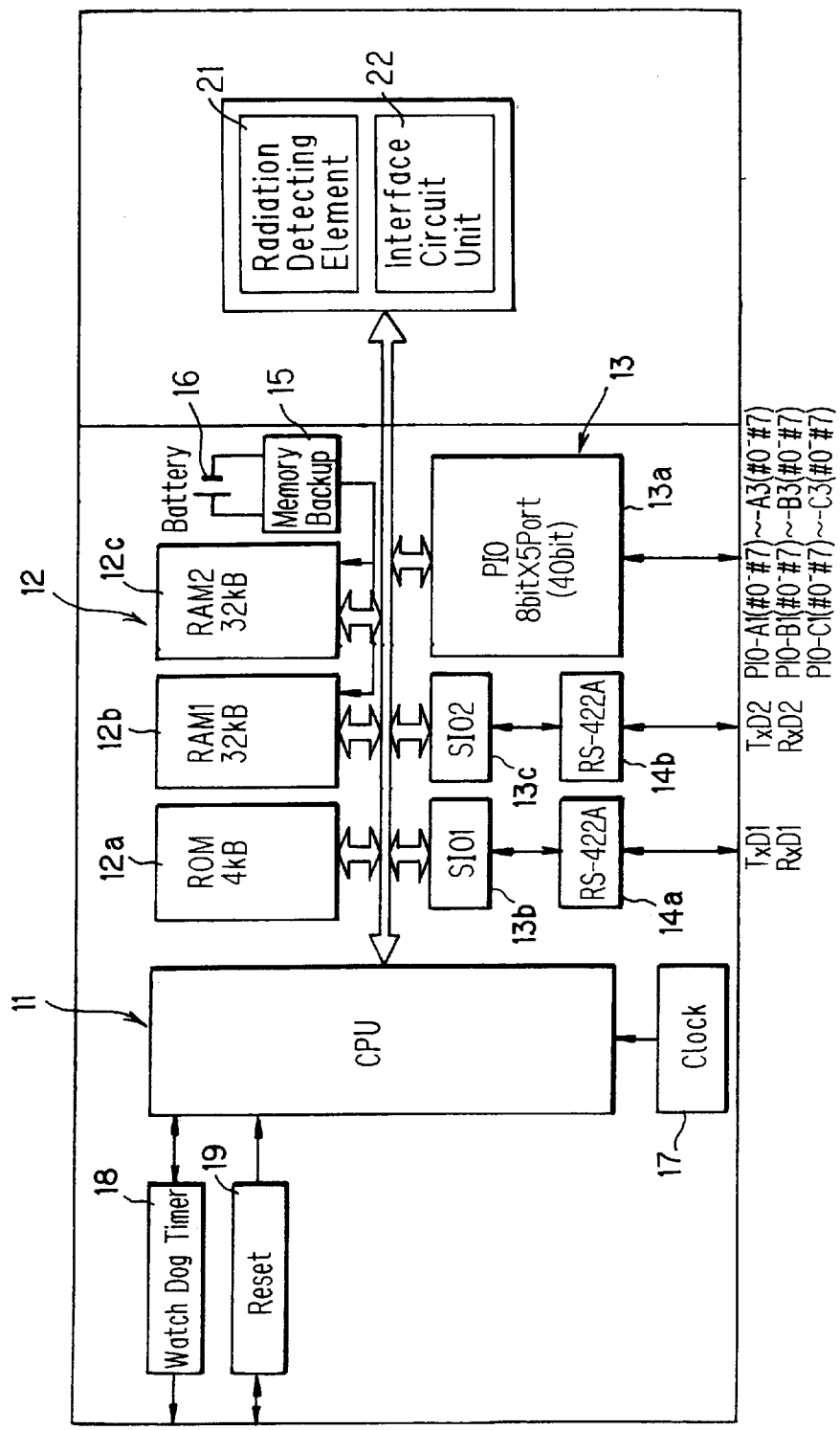
FIG. 3 is an entire constitution diagram of the microcomputer.
Figure 4:
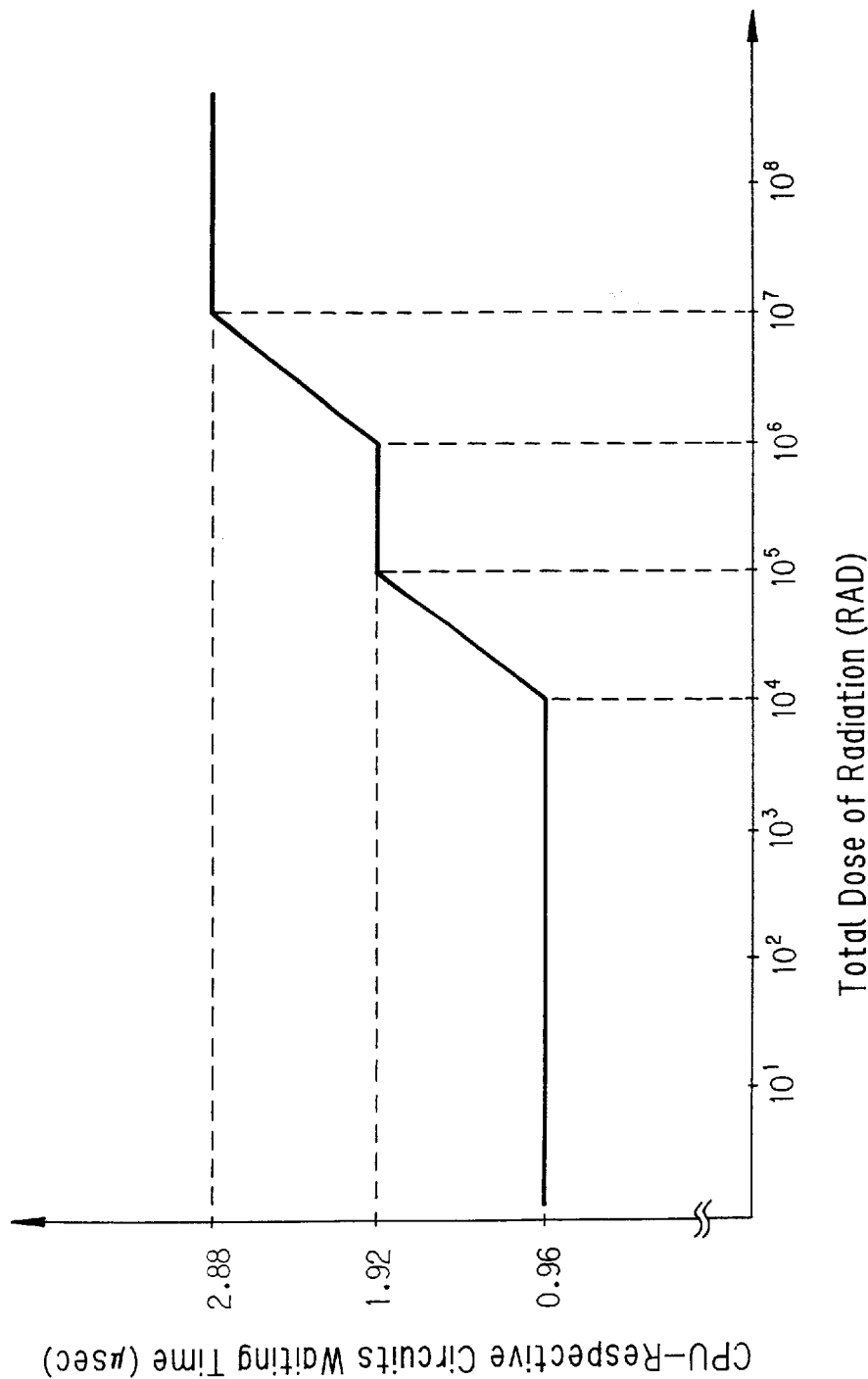
FIG. 4 is a relation drawing of the total dose of radiation versus a waiting time between CPU and respective circuits.
Figure 5:
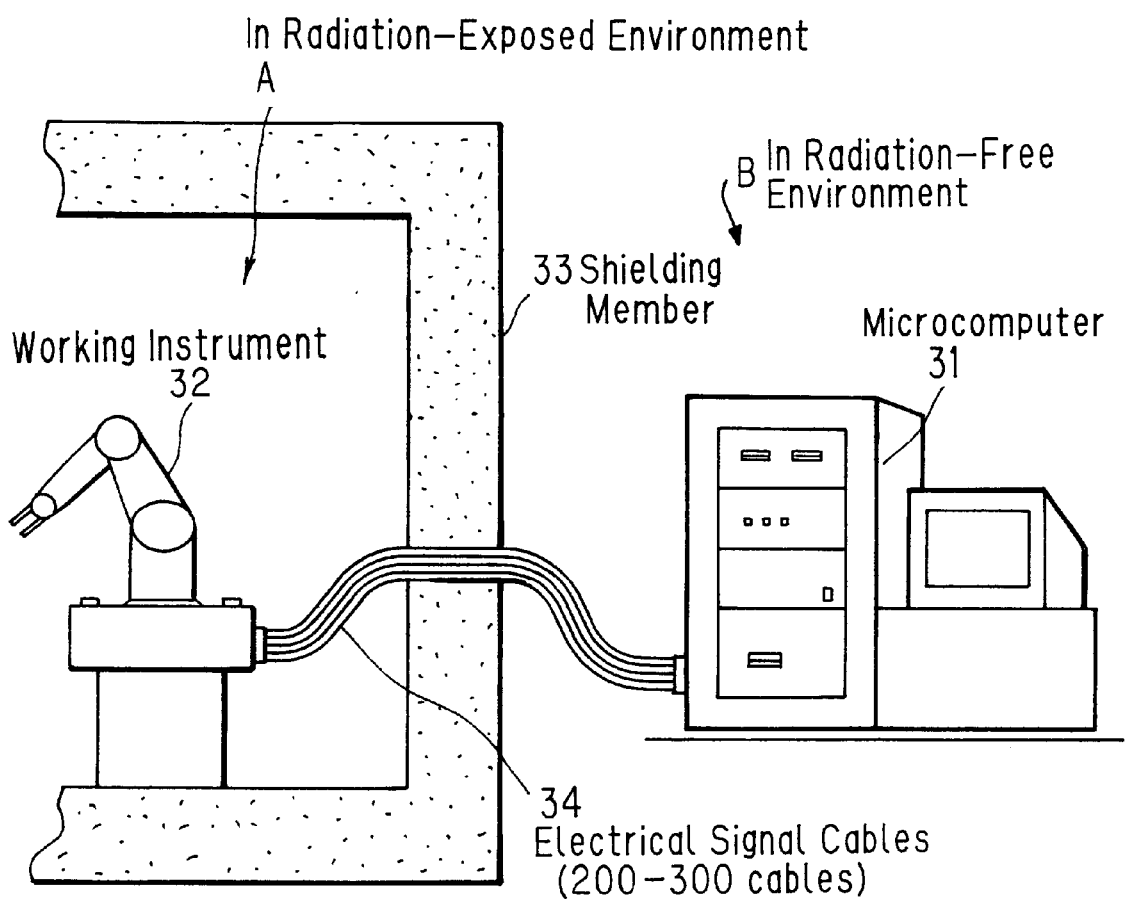
FIG. 5 is an explanation drawing showing an example of use of a conventional microcomputer.

FIG. 1 is a functional block diagram of a mainframe part of a radiation-hardened microcomputer according to the embodiment of the present invention. FIG. 2 is a constitution diagram of the mainframe part of the microcomputer. FIG. 3 is an entire constitution diagram of the microcomputer. FIG. 4 is a relation drawing of the total dose of radiation versus a waiting time between CPU and respective circuits.

<Constitution>

As shown in FIG. 1, a mainframe part of a radiation-hardened microcomputer according to the embodiment of the invention is provided with a digital circuit area 1 and an analog circuit area 2. The digital circuit area 1 has a digital signal processing circuit 3, a memory circuit 5 and other peripheral circuit 4. Whereas the analog circuit area 2 has a communication interface 6, a voltage monitoring/resetting circuit 7, and a memory backup circuit 8.

A concrete constitution of the mainframe part is as shown in FIG. 2. In FIG. 2 the reference numeral 11 denotes a CPU. Digital signals are transmitted between the CPU 11 and a memory unit 12 (ROM 12a, RAM 12b, RAM 12c) or a circuit interface unit 13 (PIO 13a, SIO 13b, SIO 13c) provided in its surroundings.

The RAM's 12a, 12b of the memory unit 12 are to be backed up by a memory backup circuit 15 connected to a battery 16. Further, in FIG. 2, the reference numeral 17 designates a clock circuit, 18 a watchdog timer, and 19 a resetting circuit 19.

When this microcomputer is used in a radiation-exposed environment, an access speed between the CPU 11 and the memory unit 12 or the circuit interface unit 13 provided in its surroundings varies with the total dose of radiation which the microcomputer receives. This is because the characteristics of the IC's (LSI) of the microcomputer vary according to the radiation. Under this situation, an access between the CPU 11 and the memory unit 12 or the circuit interface unit 13 becomes impossible. To avoid this situation, this embodiment is designed such that the CPU 11, and the memory unit 12 and circuit interface unit 13, which access the CPU 11, are integrated on a single chip (ASIC: application-specific integrated circuit), whereby they are downsized and produced by the same process. Because of this configuration, these ASIC-transformed parts are made to deteriorate and change in the same direction. In other words, the dose of radiation that those parts receive is rendered uniform by ASIC-transforming these parts to downsize them. Also, by ASIC-transforming these parts so that they are produced by the same process, their characteristics in response to radiation are brought into conformity.

Next, as shown in FIG. 3, a radiation detecting element 21, and an interface circuit unit 22 for transmitting a detection signal from the radiation detecting element 21 to the CPU 11 are provided in the microcomputer. According to this embodiment, the radiation detecting element 21 is capable of detecting the dose of radiation accurately without being affected by temperature (as in Japanese Patent Application No. 122246/97, previously filed by the present applicant).

The CPU 11 takes in detection signals from the radiation detecting element 21 via the interface circuit unit 22, and adds them up to determine the total dose of radiation that the microcomputer receives. An access speed is controlled on the basis of this determined total dose of radiation, and table data which have been preset based on tests and stored into the memory unit 12. Concretely, as shown in FIG. 4, a signal output waiting time which the CPU 11 uses when accessing the outside units (memory unit 12 and circuit interface unit 13) is self-judged and automatically changed by the microcomputer (CPU 11) on the basis of the total dose of radiation, and the table data representing the relation between the total dose of radiation and the waiting time.

<Actions and Effects>

According to the present embodiment, therefore, even when the microcomputer is used in a radiation-exposed environment and the semiconductor parts in the microcomputer are deteriorated and changed in characteristics because of the radiation, the total dose of the radiation that the microcomputer receives is determined on the basis of detection signals from the radiation detecting element 21. Based on the determined total dose of radiation, and the table data preset by tests and stored into the memory unit 12, the CPU 11 controls an access speed. Thus, the influence of radiation is neutralized to prevent inaccessibility between the CPU 11 and the surrounding memory unit 12 or circuit interface unit 13. Consequently, the functions and performance of the microcomputer can be maintained for a long period of time. Hence, the life of the microcomputer in a radiation-exposed environment can be prolonged to 10 to 100 times that of the conventional microcomputer. Even in a high dose radiation environment, the microcomputer can be used for a long period of time (2 to 10 years).

According to the instant embodiment, moreover, the CPU 11, and the memory unit 12 and circuit interface unit 13 that access the CPU 11 are integrated on a single chip (ASIC). These units on the same chip are deteriorated and changed in the same direction, without fail, on exposure to radiation. Thus, the above-described actions and effects can be obtained reliably.

The microcomputer is installed in instruments for use in radiation-exposed environments (nuclear power field and cosmic field). As a result, the automatic control of these instruments become possible, producing the following advantages:

① Since the intracellular electric signal cables of nuclear power related facilities are markedly reduced, the cells can be decreased in size and cost, and improved in maintainability.

② In the nuclear power field and the cosmic field, remote-controlled mechatronization (robotization) can be achieved.

According to the present embodiment, furthermore, a radiation detecting element capable of detecting the dose of radiation accurately without being affected by temperature is used as the radiation detecting element 21. Thus, even if the temperature of the radiation detecting element 21 changes in response to temperature changes of the detection environment or heat generation due to changes in the irradiation intensity of radiation, the total dose of radiation can be measured accurately, whereby the access speed can be controlled. In an environment with few temperature changes in the radiation detecting element, it goes without saying that an ordinary radiation detecting element may be used.

In the above embodiment, summation of the detected values of radiation (calculation of the total dose of radiation) is performed by the CPU 11. Needless to say, the arithmetic unit for calculating the total dose of radiation may be provided in the radiation detecting element 21, and data on the total dose of radiation calculated by this arithmetic unit may be transmitted to the CPU 11.

As concretely described along with the embodiment, the microcomputer of the present invention comprises:

a radiation measuring unit which measures a dose of radiation which the microcomputer receives;

a storage unit which stores preset data indicative of a relationship between the dose of radiation and an access speed; and a main arithmetic unit which controls the access speed on the basis of the measured dose of radiation and the preset data.

The access speed control method according to the invention is that of a microcomputer comprising:

measuring a dose of radiation which the microcomputer receives;

pre-establishing data indicative of a relationship between the dose of radiation and an access speed; and controlling the access speed on the basis of the measured dose of radiation and the pre-established data.

The microcomputer of the invention is also characterized in that the storage unit stores the preset data in a form of a table.

The microcomputer of the invention is also characterized in that the preset data are determined by testing.

The microcomputer of the invention is also characterized in that the preset data are set such that the access speed is reduced as the dose of radiation increases.

The access speed control method of the invention is also characterized in that the pre-establishing step includes the step of obtaining the data by testing.

The access speed control method of the invention is also characterized in that the data are pre-established such that the access speed is reduced as the dose of radiation increases.

The robot used in a radiation-exposed environment according to the present invention comprises:

a microcomputer disposed in the radiation-exposed environment, the microcomputer having,
a radiation measuring unit which measures a dose of radiation which the microcomputer receives,
a storage unit which stores preset data indicative of a relationship between the dose of radiation and an access speed, and
a main arithmetic unit which controls the access speed based on the measured dose of radiation and the preset data; and
a working instrument disposed in the radiation-exposed environment and controlled by the microcomputer.

According to the above microcomputer and its access speed control method, therefore, even when the microcomputer is used in a radiation-exposed environment and the semiconductor parts in the microcomputer are deteriorated and changed in characteristics because of the radiation, the dose of the radiation that the microcomputer receives is measured by the radiation measuring unit. Based on the measured dose of radiation, and the table data preset by tests and stored into the memory unit, the main arithmetic unit controls an access speed. Thus, the influence of radiation is neutralized, so that the functions and performance of the microcomputer can be maintained for a long period of time. Even in a high dose radiation environment, therefore, the microcomputer can be used for a long period of time.

The microcomputer is installed in instruments for use in radiation-exposed environments (nuclear power field and cosmic field), thus making the automatic control of these instruments possible, and producing the following advantages:

① Because of a marked cutback in the intracellular electric signal cables of nuclear power related facilities, the cells can be decreased in size and cost, and improved in maintainability.

② Remote-controlled mechatronization (robotization) can be achieved in the nuclear power field and the cosmic field.

The microcomputer of the present invention is also characterized in that the main arithmetic unit, peripheral control unit, and storage unit are integrated on a single chip.

The access speed control method of the microcomputer of the present invention is also characterized in that the main arithmetic unit, peripheral control unit, and storage unit are integrated on a single chip.

According to the microcomputer and its access speed control method, the arithmetic unit, peripheral control unit and memory unit are integrated on a single chip. These units on the same chip are deteriorated and changed in the same direction, without fail, on exposure to radiation. Thus, the aforementioned actions and effects can be obtained reliably.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microcomputer, comprising:
a radiation measuring unit which measures a dose of radiation which the microcomputer receives;
a storage unit which stores preset data indicative of a relationship between the dose of radiation and an access speed; and
a main arithmetic unit which varies the access speed on the basis of the measured dose of radiation and the preset data.

2. The microcomputer of claim 1, wherein said storage unit stores said preset data in a form of a table.

3. The microcomputer of claim 1, wherein said preset data are determined by testing.

4. An access speed control method of a microcomputer, comprising:
measuring a dose of radiation which the microcomputer receives;
pre-establishing data indicative of a relationship between the dose of radiation and an access speed; and
varying the access speed on the basis of the measured does of radiation and the pre-established data.

5. The access speed control method of claim 4, wherein said pre-establishing step includes the step of,
obtaining the data by testing.

6. A microcomputer, comprising:
a radiation measuring unit which measures a dose of radiation which the microcomputer receives;
a storage unit which stores preset data indicative of a relationship between the dose of radiation and an access speed;

a main arithmetic unit which controls the access speed on the basis of the measured dose of radiation and the preset data; and a peripheral control unit, wherein the main arithmetic unit, the peripheral control unit, and the storage unit are integrated on a single chip.

7. An access speed control method of a microcomputer, comprising:

measuring a dose of radiation which the microcomputer receives;

pre-establishing data indicative of a relationship between the dose of radiation and an access speed;

controlling the access speed on the basis of the measured dose of radiation and the pre-established data; and integrating the main arithmetic unit, a peripheral control unit, and the storage unit on a single chip.

8. A microcomputer, comprising:

a radiation measuring unit which measures a dose of radiation which the microcomputer receives;

a storage unit which stores preset data indicative of a relationship between the dose of radiation and an access speed; and a main arithmetic unit which controls the access speed on the basis of the measured dose of radiation and the preset data, wherein said preset data are set such that the access speed is reduced as the dose of radiation increases.

9. An access speed control method of a microcomputer, comprising:

measuring a dose of radiation which the microcomputer receives;

pre-establishing data indicative of a relationship between the dose of radiation and an access speed; and controlling the access speed on the basis of the measured dose of radiation and the pre-established data, wherein said data are pre-established such that the access speed is reduced as the dose of radiation increases.

10. A robot used in a radiation-exposed environment, comprising:

a microcomputer disposed in the radiation-exposed environment, said microcomputer having, a radiation measuring unit which measures a dose of radiation which said microcomputer receives, a storage unit which stores preset data indicative of a relationship between the dose of radiation and an access speed, and a main arithmetic unit which varies the access speed based on the measured dose of radiation and the preset data; and a working instrument disposed in the radiation-exposed environment and controlled by said microcomputer.

* * * * *

UNITED STATES PATENT AND TRADEMARK OFFICE
CERTIFICATE OF CORRECTION

PATENT NO.    : 6,275,747 B1
DATED         : August 14, 2001
INVENTOR(S)   : Takao Wada et al.

It is certified that error appears in the above-identified patent and that said Letters Patent is hereby corrected as shown below:

<u>Title page,</u>
Item [73], Assignees, please change the address of the second assignee from "Japan Nuclear Cycle Development Institute, Obaraki, both of (JP)" to -- Japan Nuclear Cycle Development Institute, Ibaraki, both of (JP) --.

Signed and Sealed this

Twenty-second Day of April, 2003

JAMES E. ROGAN
*Director of the United States Patent and Trademark Office*